No. 683,484. Patented Oct. 1, 1901.
S. NIXON.
HARVESTER REEL.
(Application filed July 8, 1901.)
(No Model.)
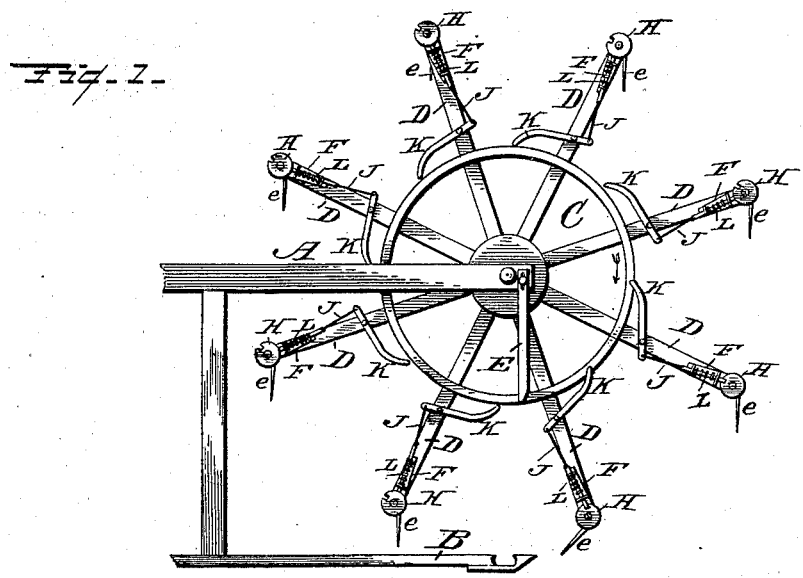
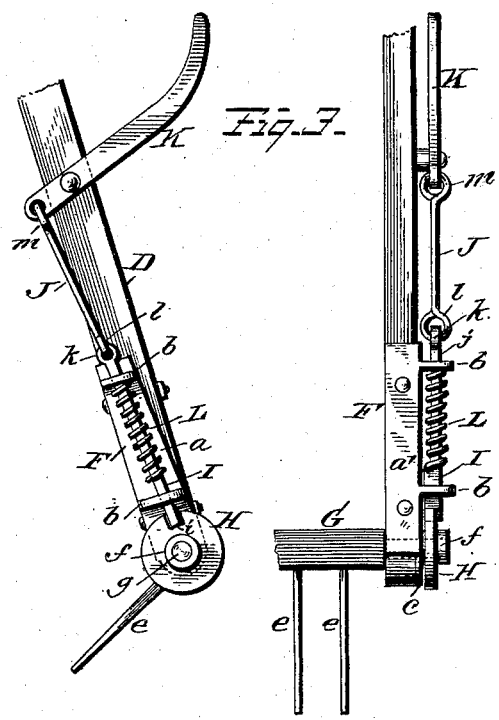
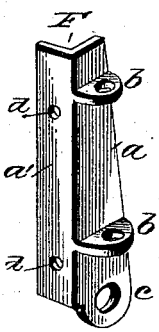
Witnesses
C. J. Williamson
Chas. W. Brooks
Inventor
Samuel Nixon,
per Chas. H. Fowler
Attorney

UNITED STATES PATENT OFFICE.

SAMUEL NIXON, OF CLYDE, WASHINGTON.

HARVESTER-REEL.

SPECIFICATION forming part of Letters Patent No. 683,484, dated October 1, 1901.

Application filed July 8, 1901. Serial No. 67,526. (No model.)

*To all whom it may concern:*

Be it known that I, SAMUEL NIXON, a citizen of the United States, residing at Clyde, in the county of Walla Walla and State of Washington, have invented certain new and useful Improvements in Harvester-Reels; and I do hereby declare that the following is a full, clear, and exact description of the same, reference being had to the annexed drawings, making a part of this specification, and to the letters of reference marked thereon.

The present invention has reference to that class of harvester-reels for which a patent was granted to me the 9th day of April, 1901, and numbered 671,707, and is designed as an improvement thereon and in the means employed for automatically holding and also releasing the pivoted tooth-bar during the rotation of the reel, so that the teeth of the bar will not be obstructed by the grain when passing over the same.

The invention consists of a harvester-reel constructed substantially as shown in the drawings and hereinafter described and claimed.

Figure 1 of the drawings is an end view of a harvester-reel embodying my improvement, said reel being shown as pivotally connected to the usual frame above the sickle; Fig. 2, a side elevation, on an enlarged scale, of the mechanism employed for automatically holding and releasing the pivoted tooth-bar; Fig. 3, a front elevation thereof; Fig. 4, a detail perspective view of the bracket for securing to the end of the radial reel-arm.

In the accompanying drawings, A represents one of the supporting-arms of what I term the "frame" for connecting the reel thereto, said frame being of any desirable construction and disposed over the sickle B of a harvester. There are two of these supporting-arms A, to the outer ends of which the rotatable reel C is pivotally connected, said reel being constructed in any suitable manner with the usual radial arms D, the particular form of the reel and manner of supporting it being subject to many changes or modifications without affecting the essential features of my invention, which lie in the mechanism for automatically operating the tooth-bar. The extremity of one of the arms A is provided with a suitable trip device E, which is preferably adjustable and may be of any desirable form and construction, as shown in my former patent. Upon the outer ends of the radial arms D are secured brackets F in the form of angle-plates having two right-angle sides $a$ $a'$, or, in other words, the two sides are at right angles to each other to fit against the sides of the radial arms. This bracket is cast with guides $b$, extending horizontally from the side $a$ thereof, and also with an eye $c$, which extends beyond the outer extremity of the bracket, as shown in Fig. 4 of the drawings.

The bracket F has holes $d$ for connecting the same to the end of the radial arms by screws or other suitable fastenings, or the bracket may be secured in place by any means found best adapted to the purpose.

The reel-arms D are provided with the usual pivoted tooth-bars G, which carry the teeth $e$, said bars being pivoted in any suitable manner to the ends of the arms at the opposite ends of the reel. The pivot-pins of the tooth-bars G extend through holes in the ends of the arms D and through the eyes $c$ of the brackets F, the pivot-pins having rigidly connected to their ends the disks H. The disks may be provided with interiorly-screw-threaded hubs $f$, engaging the exterior screw-threads on the pivot-pins (indicated at $g$) or the disks may be keyed or otherwise securely fastened to the pins, as found most preferable, this being entirely left to the judgment of the manufacturer, the hub being desirable to strengthen the disk and point of connection between it and the pin.

The disk H has a notch $i$ on its periphery, with which engages a bolt I, which bolt extends through the outer one of the guides $b$, as shown in Figs. 2 and 3 of the drawings.

The bolt I has a shank $j$, which extends through the inner one of the guides $b$ and terminates in an eye $k$, with which engages the eye $l$ of a wire link J. The eye $m$, upon the opposite end of the link J, engages the end of an arm of lever K, which arm is pivoted to the radial arm of the reel and acts in conjunction with the trip device E to release the bolt from engagement with the disk when the lever comes in contact with the trip device as the reel is being rotated.

The lever K, as in my former patent, is curved at its end to render it more effective when coming in contact with the trip device; but any suitable form of arm or lever or like device that will act when coming in contact with the trip device to release the bolt from the disk may be substituted for that shown.

A coil-spring L encircles the shank $j$ of the bolt I, as shown in Figs. 2 and 3 of the drawings, so that the pressure of the spring on the bolt will cause it to engage the notch $i$ of the disk H when said disk is in position to bring the notch on line with the bolt, and when thus engaged the teeth are rigid and in a raking position.

The bracket F materially strengthens the outer end of the radial arm D, to which the tooth-bar is pivotally connected, and a very simple, strong, and durable means is provided for operating the tooth-bars of a harvester-reel, in holding them stationary when brought to a raking position, and also releasing them, so that they will act on their pivots in passing over the grain without the teeth thereof disturbing the same.

Having now fully described my invention, what I claim as new, and desire to secure by Letters Patent, is—

1. A harvester-reel comprising a plurality of radial arms, tooth-bars pivotally connected to the arms, notched disks rigidly connected to the pivoted ends of the bars, spring-actuated bolts adapted to engage the notches in the disks to hold the bars stationary, and means for releasing the bolts from engagement with the notches of the disks, substantially as and for the purpose set forth.

2. A harvester-reel comprising a plurality of radial arms, tooth-bars pivotally connected to the arms, notched disks rigidly connected to the pivoted ends of the bars, spring-actuated bolts adapted to engage or disengage the notches in the disks, arms or lever devices connecting with the bolts and pivotally connected to the radial arms of the reel, and a suitable trip device for acting in conjunction with the lever devices to release the bolts from engagement with the notches in the disks, substantially as and for the purpose specified.

3. A harvester-reel comprising a plurality of radial arms, tooth-bars pivotally connected to the arms, brackets connected to the outer ends of the arms and having guides extending therefrom and eye extensions at their outer ends, the pivots of the tooth-bars extending through the eye extensions, and notched disks connected thereto, spring-actuated bolts adapted to engage and disengage the notches in the disks, and means for operating the bolts, substantially as and for the purpose described.

4. A harvester-reel comprising a plurality of radial arms, tooth-bars pivotally connected to the arms and notched disks at their pivotal ends and rigidly connected thereto, spring-actuated bolts adapted to engage or disengage the notches in the disks, curved levers pivoted to the radial arms of the reel and connected to the bolts through eye-links, and a suitable trip device adapted to engage the curved ends of the levers as they successively come in contact therewith, substantially as and for the purpose set forth.

5. A harvester-reel comprising a plurality of radial arms, tooth-bars pivotally connected thereto, notched disks provided with hubs for rigidly connecting them to the pivot-pins of the tooth-bars, brackets secured to the ends of the radial arms of the reel, guides upon the brackets, spring-actuated bolts engaging the guides of the bracket, lever devices pivotally connected to the radial arms of the reel and connecting with the bolts through the medium of suitable links, and a trip device for engaging the lever devices as they successively come in contact therewith, substantially as and for the purpose specified.

In testimony that I claim the above I have hereunto subscribed my name in the presence of two witnesses.

SAMUEL NIXON.

Witnesses:
S. E. KING,
W. H. DE VOE.